(12) United States Patent
Runyan et al.

(10) Patent No.: US 10,294,815 B2
(45) Date of Patent: May 21, 2019

(54) SPF/DB STRUCTURE FOR ATTENUATION OF NOISE FROM AIR FLOW

(75) Inventors: Max R. Runyan, Huntington Beach, CA (US); Daniel G. Sanders, Lake Tapps, WA (US); Larry D. Hefti, Auburn, WA (US); David R. Papenfuss, Tukwila, WA (US); Jack W. Mauldin, Mill Creek, WA (US); Luis R. Leon, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1188 days.

(21) Appl. No.: 13/410,049

(22) Filed: Mar. 1, 2012

(65) Prior Publication Data

US 2013/0251510 A1  Sep. 26, 2013

(51) Int. Cl.
*F02C 7/24* (2006.01)
*F01D 25/00* (2006.01)
*F02K 1/82* (2006.01)
*B32B 3/12* (2006.01)

(52) U.S. Cl.
CPC .............. *F01D 25/00* (2013.01); *B32B 3/12* (2013.01); *F02C 7/24* (2013.01); *F02K 1/827* (2013.01); *F05D 2260/96* (2013.01); *Y02T 50/672* (2013.01)

(58) Field of Classification Search
CPC ................................ F01D 25/00; F02K 1/827
USPC ............................................... 415/9, 119, 200
See application file for complete search history.

(56) References Cited

U.S. PATENT DOCUMENTS

| | | | | |
|---|---|---|---|---|
| 3,011,602 A | * | 12/1961 | Ensrud et al. | 428/180 |
| 3,542,152 A | * | 11/1970 | Oxx, Jr. et al. | 181/214 |
| 3,927,817 A | | 12/1975 | Hamilton et al. | |
| 4,137,992 A | * | 2/1979 | Herman | 181/213 |
| 4,217,397 A | | 8/1980 | Ecklund et al. | |
| 4,265,955 A | * | 5/1981 | Harp et al. | 428/116 |
| 4,304,821 A | | 12/1981 | Hayase et al. | |
| 4,495,237 A | * | 1/1985 | Patterson | 428/178 |
| 4,833,768 A | | 5/1989 | Ecklund et al. | |
| 4,850,093 A | * | 7/1989 | Parente | 29/428 |
| 5,055,143 A | | 10/1991 | Runyan et al. | |
| 5,251,435 A | * | 10/1993 | Pauley | B64D 29/00 244/54 |
| 5,330,092 A | | 7/1994 | Gregg et al. | |
| 5,715,644 A | | 2/1998 | Yasui | |

(Continued)

FOREIGN PATENT DOCUMENTS

CA   2516437 A1   9/2004
CN   1043894A A   7/1990

(Continued)

OTHER PUBLICATIONS

International Search Report and Written Opinion for related International Application No. PCT/US2013/045727; dated Dec. 23, 2015.

(Continued)

*Primary Examiner* — Kayla McCaffrey
(74) *Attorney, Agent, or Firm* — Miller, Matthias & Hull LLP

(57) ABSTRACT

A propulsion system comprises a turbine engine, and an engine nacelle including an SPF/DB inner wall having a hot side face sheet against the engine and a cold side face sheet that has noise attenuation openings.

20 Claims, 8 Drawing Sheets

(56) References Cited

U.S. PATENT DOCUMENTS

| | | | |
|---|---|---|---|
| 6,051,302 A * | 4/2000 | Moore | 428/116 |
| 6,983,912 B2 | 1/2006 | Connelly et al. | |
| 7,850,058 B2 | 12/2010 | Connelly et al. | |
| 7,927,686 B2 | 4/2011 | Zielinksi et al. | |
| 7,943,227 B2 | 5/2011 | Connelly | |
| 2002/0050420 A1 | 5/2002 | Porte et al. | |
| 2005/0109557 A1 | 5/2005 | Dravet et al. | |
| 2006/0255098 A1* | 11/2006 | Runyan | 228/112.1 |
| 2012/0308379 A1* | 12/2012 | Scarr | 415/215.1 |

FOREIGN PATENT DOCUMENTS

| | | |
|---|---|---|
| CN | 102817719 A | 12/2012 |
| EP | 1 533 787 A1 | 5/2005 |
| EP | 1533787 A1 | 5/2005 |
| EP | 2 530 016 A2 | 5/2012 |
| EP | 2530016 A2 | 12/2012 |
| RU | 94019373 A | 8/1996 |
| RU | 94019374 A | 8/1996 |
| RU | 94019375 A | 8/1996 |
| RU | 2011107174 A | 9/2012 |
| WO | 92/12854 A1 | 8/1992 |
| WO | 9212854 A1 | 8/1992 |
| WO | 97/27045 A2 | 7/1997 |
| WO | 9727045 A2 | 7/1997 |

OTHER PUBLICATIONS

Russian Office Action for related Application No. 2015137413/11; dated Mar. 22, 2017.
Office Action for related Chinese Application No. 2013800773997; dated Sep. 11, 2017.
Japanese Office Action for related Application No. 2016-519483; dated May 9, 2017.
Examination Report for related Australian Application No. 2013392079; dated May 9, 2017.
Canadian Office Action for related Application No. 201380077399.7; dated Jan. 9, 2017.
Office Action for related Chinese Application No. 2013800773997; dated Feb. 23, 2018.
Canadian Office Action for Application No. 2,904,186, dated Aug. 21, 2018.
Chinese Office Action for Application No. 201380077399.7, dated Aug. 3, 2018.

* cited by examiner

- 820
- 810
- 800

FORM SPF/DB STRUCTURES — 1010

JOIN THE STRUCTURES TOGETHER TO FORM A FULL CROSS-SECTION OF AN INNER NACELLE WALL — 1020

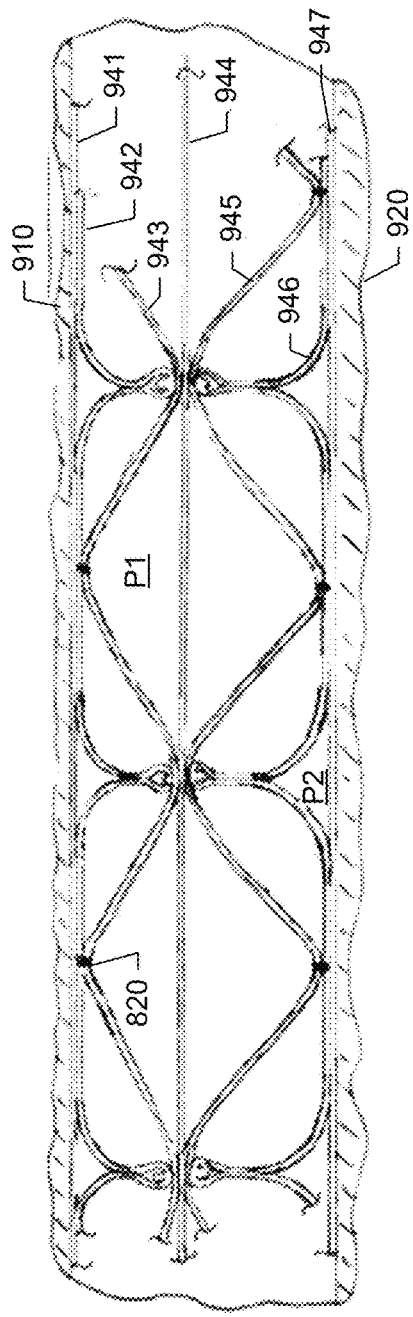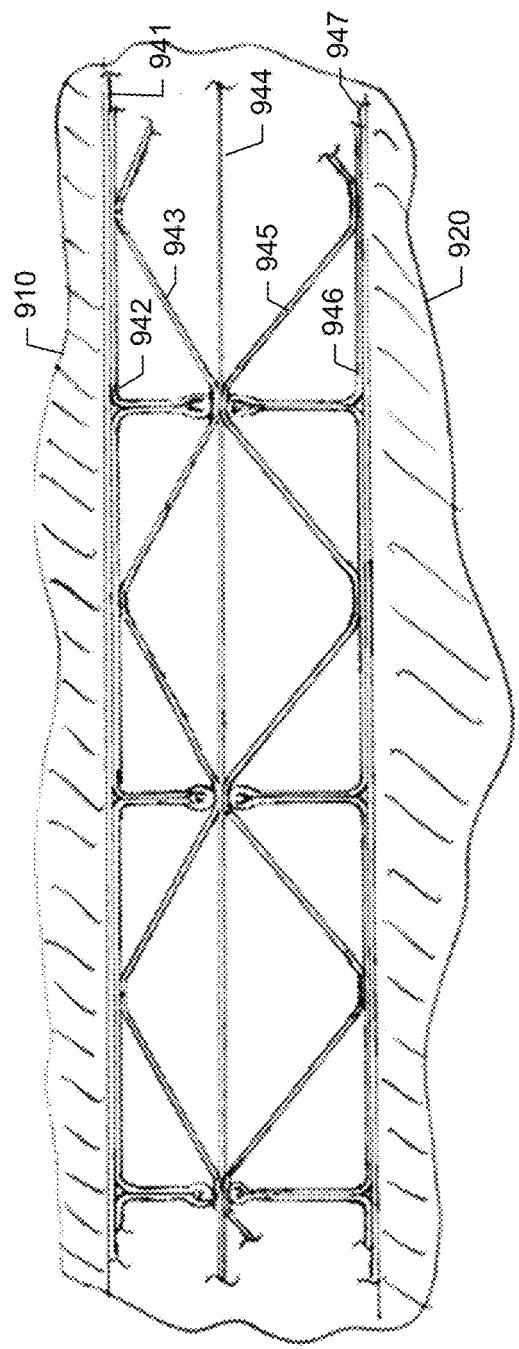

SPF/DB STRUCTURE FOR ATTENUATION OF NOISE FROM AIR FLOW

BACKGROUND

Engine nacelles are used to control input and exhaust of engine air flow, facilitate maintenance, and suppress noise generated by high bypass turbofan engines. A nacelle may include an acoustic liner made up of a composite sandwich structure of face sheets and a honeycomb core. The face sheets are perforated for noise attenuation. The nacelle may further include insulation blankets made of ceramic and metallic materials between the acoustic liner and the engine's core. The insulation blankets protect the sandwich structure against the engine heat.

The insulation blankets add weight, require maintenance, and increase the cost of the nacelle, but do not directly provide structural benefit. Moreover, the insulation blankets take up significant space that may cause fan duct diameter to increase. They also place a non-smooth surface in the path of large volumes of air flow, which increases drag. The increased aircraft weight and drag are detrimental to fuel efficiency.

A need exists for a high-temperature acoustic liner with noise attenuation capability. Due to the shape of a typical gas turbine engine and nacelle performance needs, a further need exists for the acoustic liner to conform to complex (e.g., double contoured) surfaces.

SUMMARY

According to an embodiment herein, a propulsion system comprises a turbine jet engine, and an engine nacelle including an SPF/DB inner wall having a hot side face sheet against the engine's core and a cold side face sheet that has noise attenuation openings.

According to another embodiment herein, a fan duct comprises an SPF/DB sandwich structure including a face sheet that forms an inner wall and has a plurality of openings configured to suppress noise.

According to another embodiment herein, a monolithic SPF/DB sandwich structure comprises a core sandwiched between first and second face sheets. The core includes a plurality of cells. The first face sheet has a plurality of openings for allowing noise and air to enter into the cells.

These features and functions may be achieved independently in various embodiments or may be combined in other embodiments. Further details of the embodiments can be seen with reference to the following description and drawings.

BRIEF DESCRIPTION OF THE DRAWINGS

FIGS. 9A-9D are illustrations of pack expansion into an SPF/DB structure.

DETAILED DESCRIPTION

Figure 1:
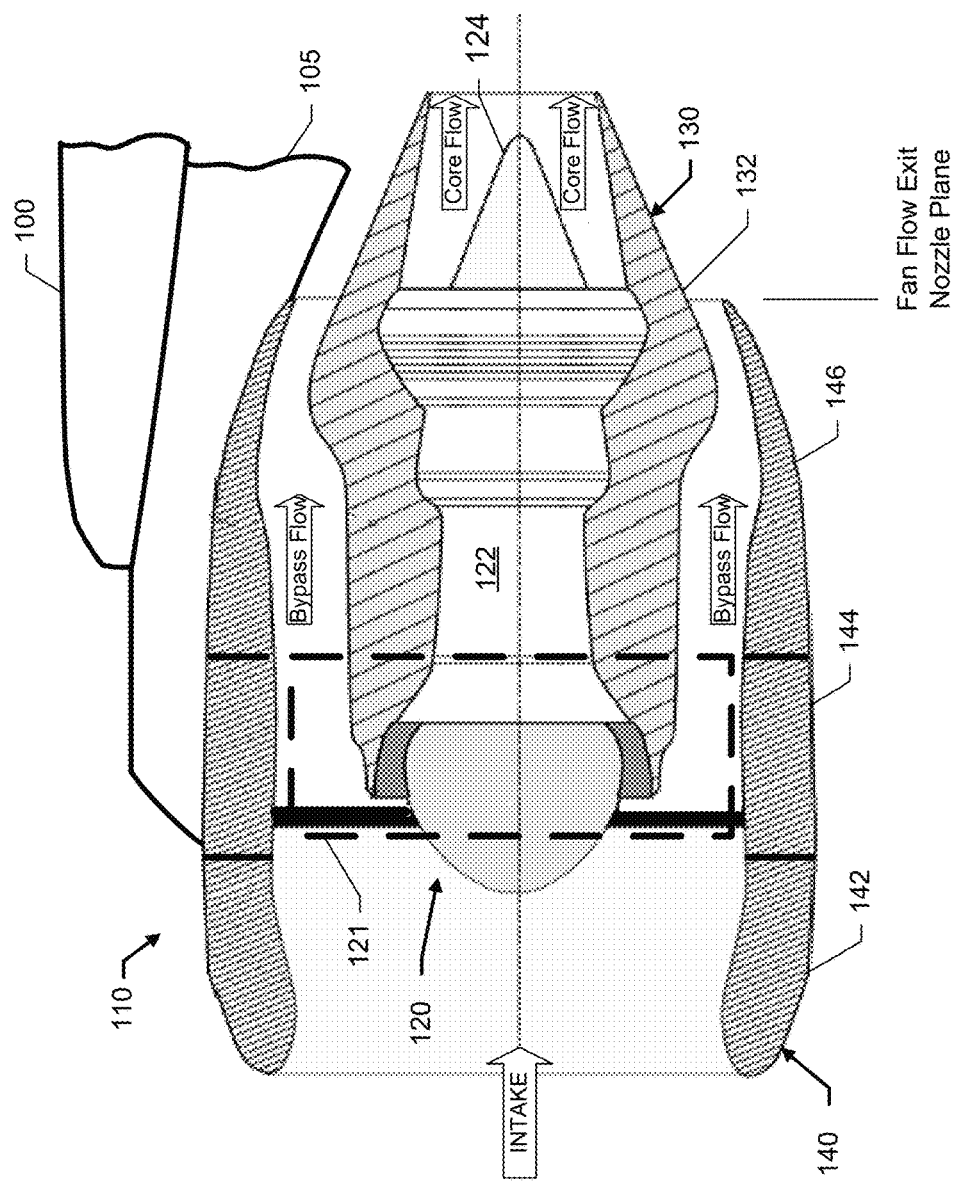
FIG. 1 is an illustration of a propulsion system including a turbine engine and a nacelle.

Reference is made to FIG. 1, which illustrates a propulsion system 110 mounted to a strut or pylon 105 beneath an aircraft wing 100. The propulsion system 110 includes a turbine jet engine. In some embodiments, the jet engine may be a turbofan engine 120. A typical turbofan engine 120 includes a ducted fan 121 and an engine core (or gas generator) 122 for driving the fan 121. The fan 121 moves a portion of intake air through the engine core 122 (the core flow) and another portion of the intake air through a fan duct 130, which bypasses the engine core 122 (the bypass or fan flow). The core flow is accelerated by a nozzle such as a plug nozzle 124. Thrust is produced by expelling the combination of the cooler bypass flow and the hotter core flow. The ratio of the mass-flow of bypass flow to core flow is referred to as the bypass ratio.

The propulsion system 110 further includes a nacelle 140, which includes cowling for covering the ducted fan and the engine core 122. The cowling may be made of a light weight construction using lower temperature capable materials such as carbon epoxy or aluminum. The cowling serves as an aerodynamic fairing for the fan duct and associated mechanisms. In the embodiment of FIG. 1, the cowling includes an engine inlet cowl 142, a fan cowl 144, and a core cowl 146.

Figure 2:
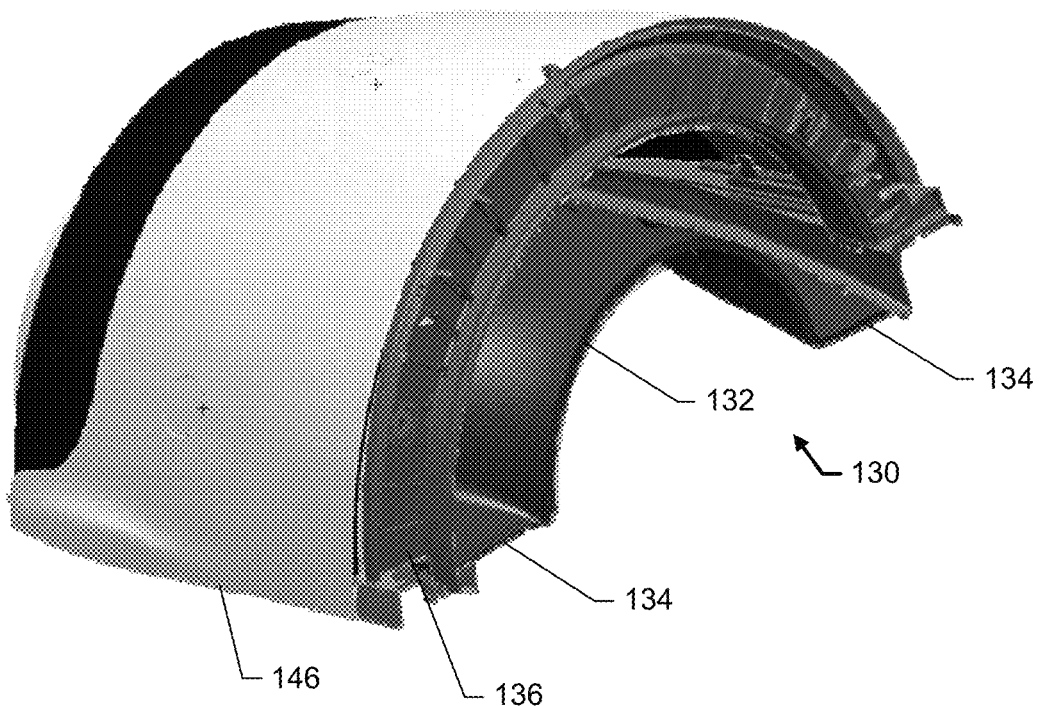
FIG. 2 is an illustration of a fan duct including an inner wall, the inner wall including a sandwich core with superplastically formed and diffusion bonded cells.

Additional reference is made to FIG. 2. The nacelle 140 further includes the fan duct 130, which also known as a thrust reverser. The fan duct 130 has an inner wall 132, which separates the bypass flow from the engine core 122. The inner wall 132 incorporates structural capability to react flow pressure loads as well as other nacelle loads. The inner wall 132 may also function as a core duct for the core flow and as a cowling for the engine core 122. As an engine core cowling, the inner wall 132 provides the combination of significant structural capability, resistance to heat and its associated thermal gradients, noise attenuation, engine fire protection, and access to the engine and its systems and components. The inner wall 132 deflects heat from the engine core 122 by conducting it into the bypass flow.

Bifurcations 134 attach the inner wall 132 to the core cowl 146. In some embodiments, the bifurcations 134 may be integral with the inner wall 132. In other embodiments, the bifurcations 134 may be joined (e.g., mechanically fastened) to the inner wall 132. In some embodiments, the core cowl 146 may be integrated with the fan duct 130, and in other embodiments the core cowl 146 may be separate from the fan duct 130.

The nacelle 130 further includes a thrust reverser deflector 136, which redirects some or most of the bypass flow outward and forward to provide reverse thrust against the forward motion of the aircraft. A portion of the deflector 136 may be attached to the inner wall 132 by linkages for doors which block off the bypass flow.

In addition to the functions above, the inner wall 132 suppresses engine noise, which is generated by turbine components of the engine core 122 as well as the fan noise that is passed into the bypass air flow. For a nacelle having a long duct (that is, a fan duct having a portion that extends beyond the fan flow nozzle exit plane), noise suppression is optional for the portion that extends beyond the fan flow nozzle exit plane.

The inner wall 132 of the nacelle 130 includes one or more SPF/DB structures that are designed to suppress the noise. In some embodiments, the inner wall 132 may be formed by a single monolithic SPF/DB structure. In other embodiments, the inner wall may include a plurality of monolithic SPF/DB structures that are welded or otherwise joined together.

Superplastic forming (SPF) generally refers to a process in which a material is superplastically deformed beyond its normal limits of plastic deformation. Superplastic forming can be performed with certain materials that exhibit superplastic properties within limited ranges of temperature and strain rate.

Diffusion bonding (DB) generally refers to a process of joining members using heat and pressure to form a solid-state coalescence between the materials of the joined members. Joining by diffusion bonding occurs at a temperature below the melting point of the parent materials that are being joined. Coalescence between the individual parent materials is produced with pressure loads that are sufficient to urge the metallurgical microstructure to fully interface and diffuse between each other until fully joined.

Each SPD/DB structure is made of material that is diffusion bondable and superplastically formable. Examples of such materials include, without limitation, grades and alloys of titanium, titanium aluminide, ceramics, glasses, ceramic metal composite, stainless steel, aluminum, Inconel and other superalloys.

Figure 3:
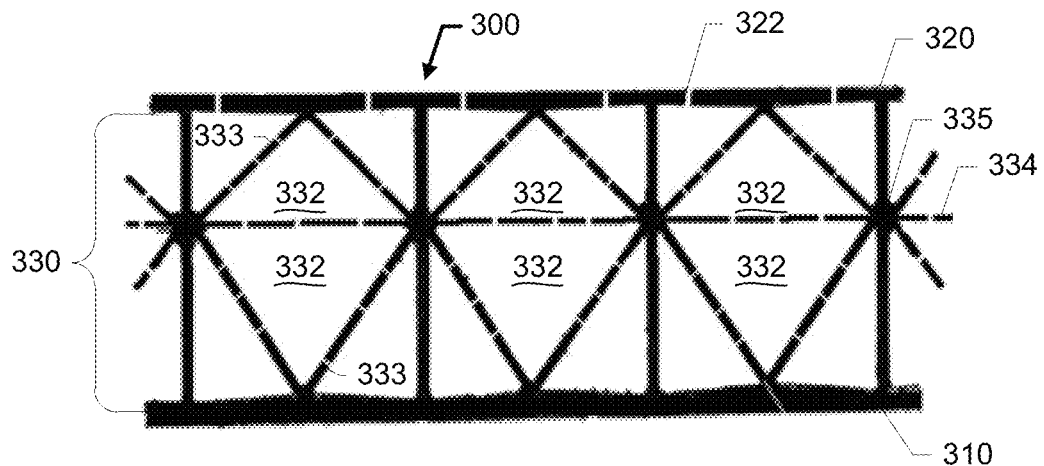
FIGS. 3 to 6 are illustrations of SPF/DB sandwich cores having cells of different sizes and configurations.

Additional reference is made to FIG. 3. Each SPF/DB structure 300 of the inner wall 132 has a hot side face sheet 310 against the engine core 122, a cold side face sheet 320 that forms an inner surface of the fan duct, and a sandwich core 330 between the face sheets 310 and 320. The hot side face sheet 310 is made of a material having better heat resistance than the cold side face sheet 320. The core 330 includes a plurality of cells 332, which form cavities between the face sheets 310 and 320. The core 330 may be made of a material having greater superplastic properties relative to materials used to form the hot side face sheet 310 and the cold side face sheet 320 in order to reduce mark-off in the face sheets 310 and 320.

The cold side face sheet 320 has noise attenuation openings 322. The noise attenuation openings 322 are arranged to allow bypass air to flow into the cells 332 of the core 330. The openings 322 and the cells 332 form a resonator, which attenuates engine noise.

The engine noise attenuation may be tuned by selection of cell height, length and width, sheet thickness, opening size, shape and spacing, and specific Percent Open Area (POA) of the cold side face sheet 320. Frequency damping is based on a functional relationship between the size of the openings 322, the thickness of the face sheet 320 having the openings 322 and the depth of the cavities below the opening. The damping is also based on the pattern of the openings 322. Differences in these variables will affect the efficiency of the noise attenuation of the structure 300. The SPF/DB structure 300 may be tuned to dampen the broadest range of jet engine noise frequencies possible.

Noise attenuation is passive. Passive attenuation does not require an active monitoring and feedback system to create out of phase sound to cancel desired frequencies. Thus, the SPF/DB inner wall 132 performs noise attenuation without the weight and maintenance of a noise attenuation system, while providing structural strength and resistance to heat.

The SPF/DB inner wall 132 provides better corrosion resistance and thermal protection than honeycomb structures. Because of the far superior high temperature performance, the SPF/DB inner wall 132 has higher structural strength and better fatigue performance, and it is more tolerant to damage than the honeycomb structures.

The SPF/DB inner wall 132 does not require an insulation blanket for protection against engine heat. By eliminating the insulation blanket, the nacelle 130 is lighter than a honeycomb structure and has smoother surfaces for air to pass by with less drag.

By eliminating the insulation blanket, the nacelle 130 is smaller than a conventional nacelle. The smaller nacelle enables larger engines having higher bypass ratios (with less fuel burn) to be used without increasing ground clearance (and landing gear length), and/or it enables more equipment and accessories to be packed into the nacelle 130.

The monolithic construction of the SPF/DB structure results in a longer life expectancy than honeycomb heat shield structures. The life of the honeycomb heat shield is dependent on the integrity of its insulating blankets. Life expectancy may be shortened if the blankets are damaged or not positioned properly. A monolithic SPF/DB structure herein does not face those problems. Life of an SPF/DB structure herein is expected to approach or exceed the life of the aircraft.

Moreover, a monolithic SPF/DB structure herein does not require the same maintenance as a honeycomb heat shield. Consequently, maintenance costs are substantially lower.

Figure 11:
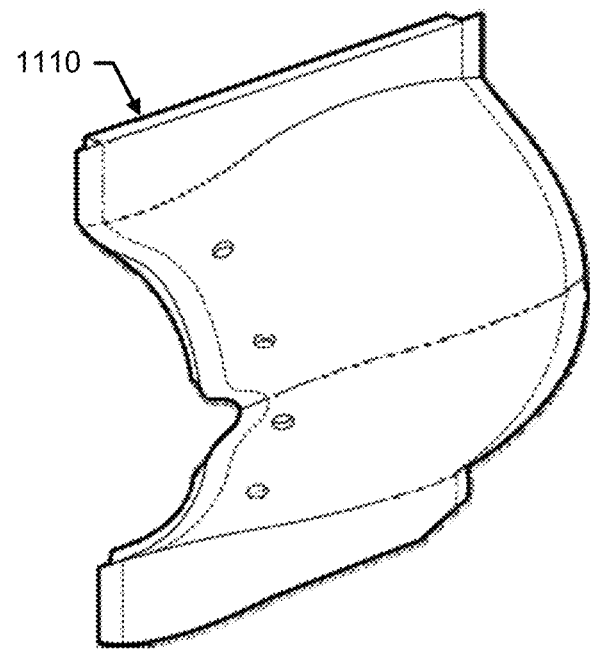
FIG. 11 is an illustration of an SPF/DB structure having a complex shape.

An SPF/DB structure herein may be formed into a complex shape. For instance, the SPF/DB structure may be formed into a shape having a circumferential compound, conical, cylindrical, single or multiple-dimensional curvature. In addition, the bifurcations may be integrally formed. An example of an SPF/DB structure 1110 having a complex shape is illustrated in FIG. 11.

The noise attenuation openings 322 are not limited to any particular geometry. Examples of opening geometries include holes, ovals, ellipses, slits, and cutouts.

The cells 332 of the core 330 are not limited to any particular geometry. Several different geometries are described in the paragraphs that follow.

Figure 4:
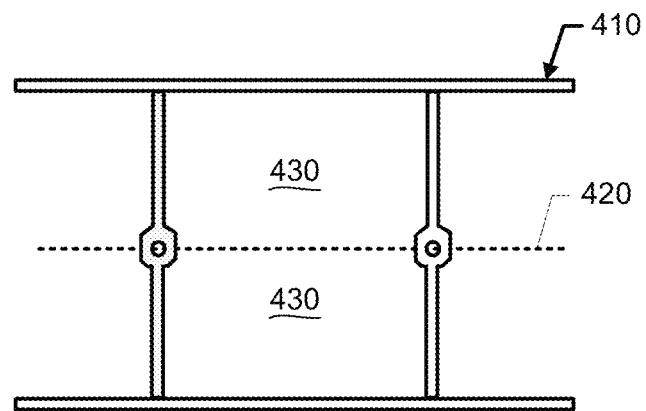

Additional reference is made to FIG. 4. In some embodiments, the core 330 may also include a perforated septum 334 between the face sheets 310 and 320. A plurality of the hot side cells 332 are between the septum 334 and the hot side face sheet 310, and a plurality of cold side cells 332 are between the septum 334 and the cold side face sheet 320.

The perforated septum 334 provides a semi permeable surface that is 90 degrees out of plane to the vertical standing wall structure. The septum 334 reflects and selectively transmits sound waves in a noise cancelling fashion.

The septum 334 is positioned mid-plane or slightly skewed closer to one face sheet than the other. As but one example, the septum 334 may be skewed 20% off-center. Skewing the septum 334 provide an additional degree of freedom for noise attenuation because the cells on one side of the septum 334 have different sizes than cells on the other side of the septum 334.

The septum 334 provides another advantage. It provides a tension diaphragm to increase the structural strength and stiffness of the inner wall 132.

The cells 332 are not limited to any particular shape. In some embodiments, the cells 332 may be triangular-shaped, as illustrated in FIG. 3. FIG. 4 illustrates a core 410 including a septum 420 and square-shaped or rectangular-shaped cells 430.

Figure 5:
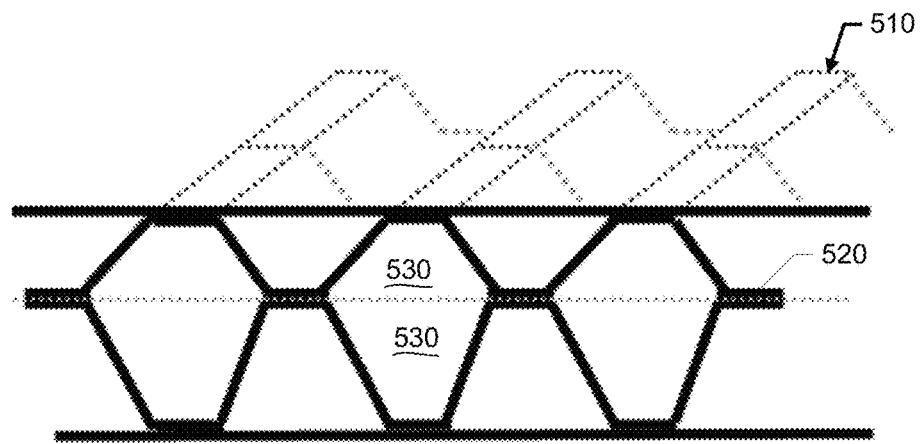
Figure 6:
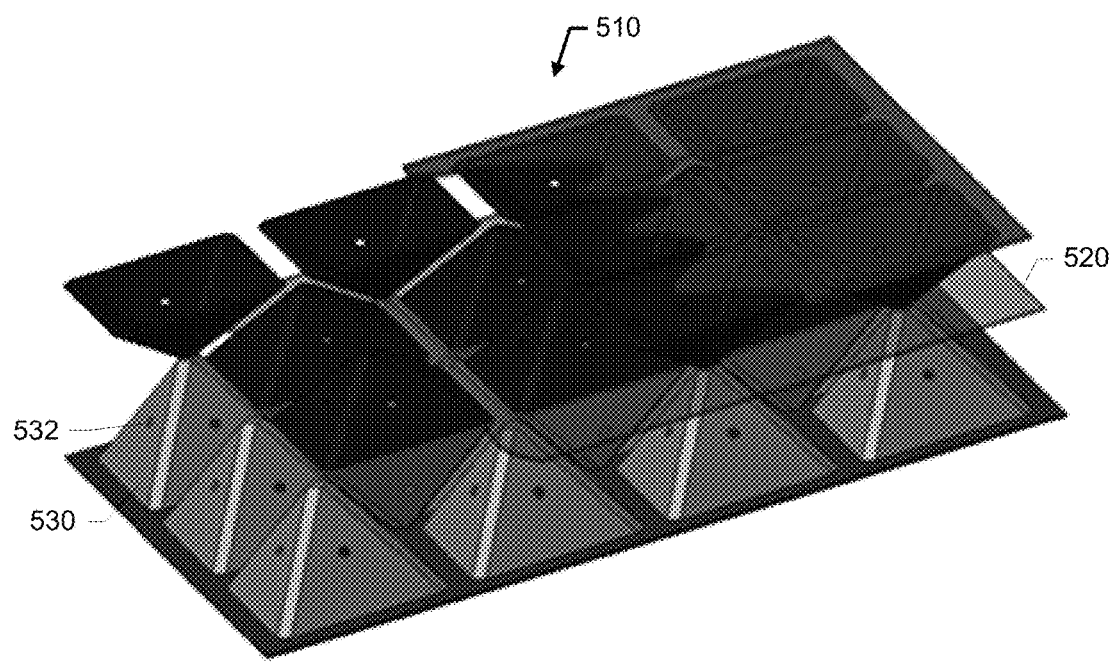

FIGS. 5 and 6 illustrate a core 510 including a septum 520 and pyramid-shaped cells 530. Bases of the pyramid-shaped cells 530 are formed on the septum 520. Each tetrahedral defines a cell.

The walls of the pyramid-shaped cells 530 may be perforated with openings 532 to provide two additional degrees of freedom for noise attenuation. Thus, an SPF/DB structure 510 having pyramid-shaped cells 530 may be tuned suppress four different frequency bands. In addition to the additional degrees of freedom, the pyramid-shaped cells 530 provide higher stiffness than, say, square-shaped cells 430.

The cells 530 shown in FIGS. 5 and 6 have three sides. In other embodiments, however, the pyramid-shaped cells may have four, five, six, seven or eight sides.

In some embodiments, the cells may be replaced with elongated channels. In some embodiments, the cells may be formed to different sizes and configurations to attenuate specific frequencies.

In some embodiments, additional noise dampening material may be attached or injected into the cells to further improve noise attenuation properties. For instance, lightweight foam may be injected into the cells.

Figure 7:
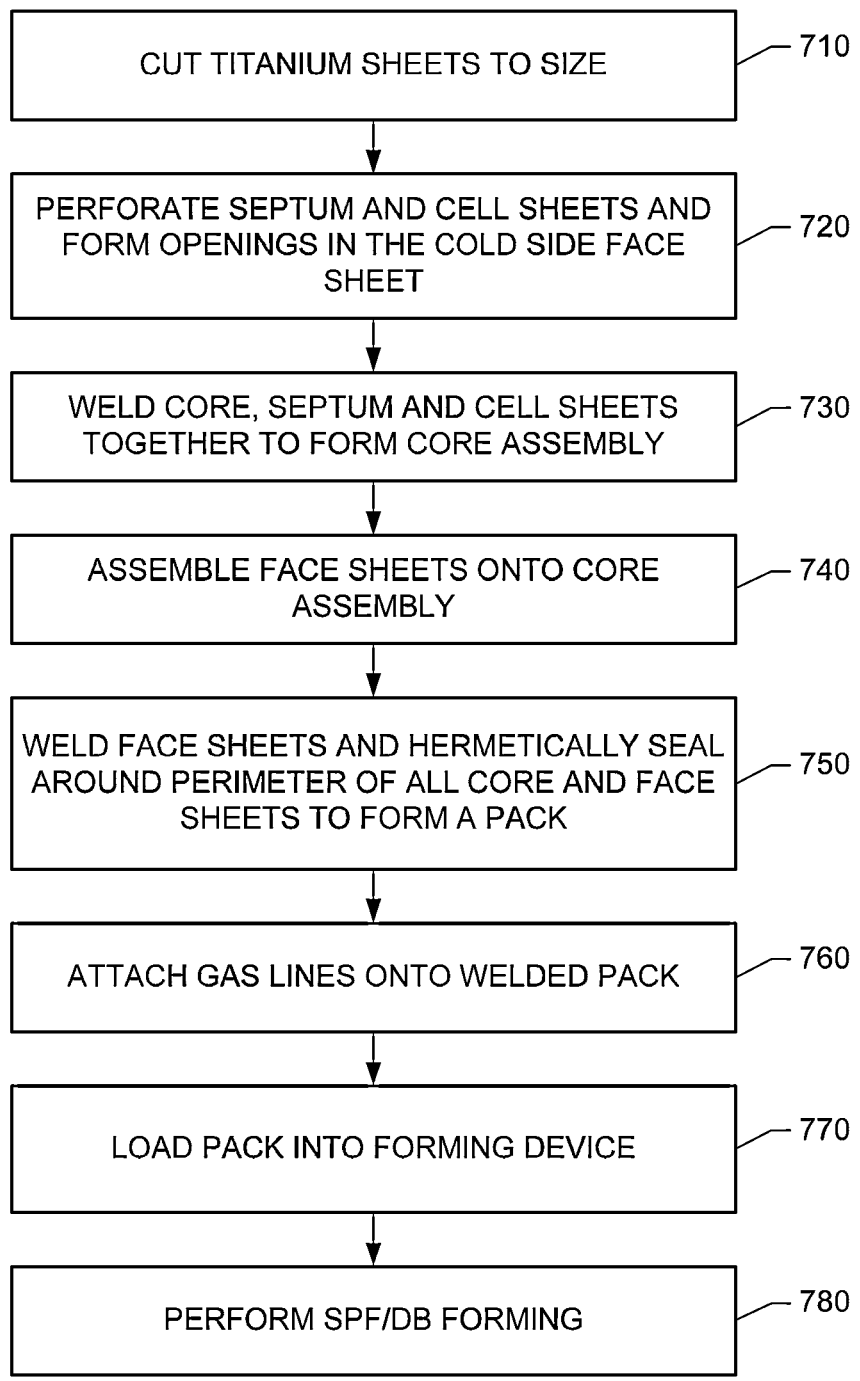
FIG. 7 is an illustration of a method of fabricating an SPF/DB structure.

Reference is made to FIG. 7, which illustrates a method of fabricating an SPF/DB structure. In this particular example, the core of the SPF/DB structure will have a septum and pyramid-shaped cells.

At block 710, titanium sheets are cut to size. For the pyramid-shaped cells, a first sheet is cut for the cold side face sheet, a second sheet is cut for the hot side face sheet, and five additional sheets are cut for the core. The core includes sheets for the septum, hot side core, cold side core, hot side pyramid cells and cold side pyramid cells.

In some embodiments, beta alloys of titanium may be used for the cold side face sheet, as the beta alloys provide high temperature oxidation resistance against corrosion promoting contaminants such as hydraulic fluid. Alpha beta alloys of titanium may be used for the core sheets. A fine grain alpha beta alloy has better SPF and diffusion bonding properties than a standard grain alloy at lower temperatures. In some embodiments, the septum may be made of commercially pure titanium instead of a fine grain alpha beta alloy. An alpha beta titanium alloy such as 6-2-4-2 may be used for the hot side face sheet as it is better in high temperature strength and is appropriate to be used next to the engine core.

At block 720, the septum and cell sheets are perforated. Openings in the cold side face sheet are formed.

Figure 8:
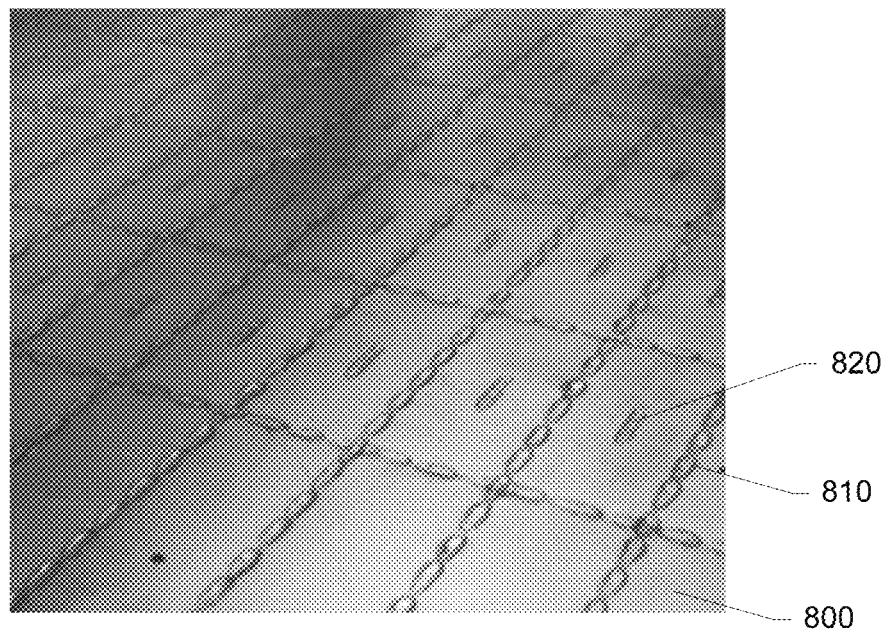
FIG. 8 is an illustration of a weld pattern for core sheets of the SPF/DB structure.

At block 730, the core, septum and cell sheets are welded together to form a core assembly. For example, the grid pattern illustrated in FIG. 8 may be used. The bases of the pyramid-shaped cells will be formed by a set of spaced-apart first weld nuggets 810 that extend through all sheets in the core, and the apexes of the pyramid-shaped cells will be formed by a set of second weld nugget 820 that extend between a cell sheet and its adjacent core sheet.

In addition to or instead of the welds, a stop-off material may be selectively provided between the sheets to prevent portions of the adjacent surfaces of the sheets from being bonded.

At block 740, the face sheets are assembled onto the core assembly. At block 750, the face sheets are welded and the perimeter of all core and face sheets are hermetically sealed to form a pack. A continuous weld may be formed near the perimeter of the pack.

At block 760, face sheet and core sheet gas lines are attached onto the pack. These core sheet gas lines will enable a first pressure P1 to be applied inside the core during SPF/DB forming, and the face sheet gas lines will enable a second pressure P2 to be applied outside of the core during SPF/DB forming.

Figure 9A:
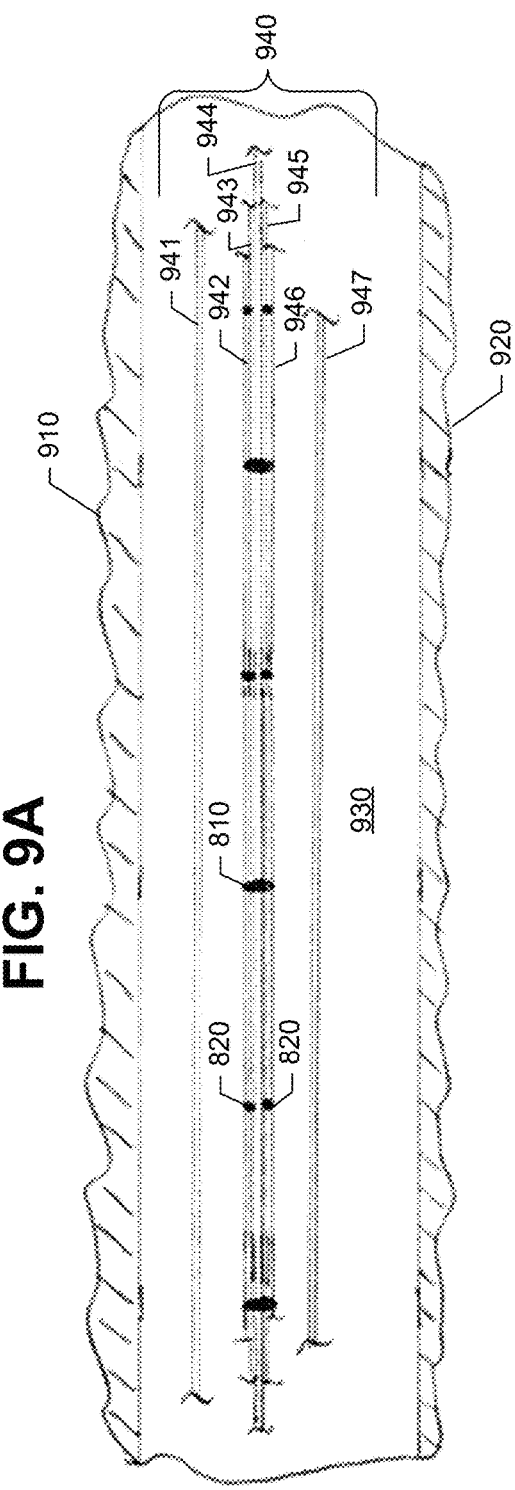

At block 770, the pack is loaded into a forming device. For instance, FIG. 9A shows high temperature forming dies 910 and 920 of a hydraulic restraint press. The dies 910 and 920 define a die cavity 930. The pack 940 is placed in the die cavity 930. The pack 940 includes cold side and hot side face sheets 941 and 947, cold side and hot side core sheets 942 and 946, cold side and hot side cell sheets 943 and 945, and a septum sheet 944.

FIG. 9A also shows each first weld nugget 810 extending through all sheets 942-946 in the core. Each second weld nugget 820 extends between a cell sheet and its adjacent core sheet.

At block 780, SPF/DB forming is performed. The pack is heated and compressed so that the adjacent portions of the sheets that are not treated with the stop-off material are joined by diffusion bonding. Thereafter, a pressurized gas is injected between the sheets to inflate the pack, and thereby superplastically form the pack to a configuration defined by the surface of the die cavity.

Figure 9B:
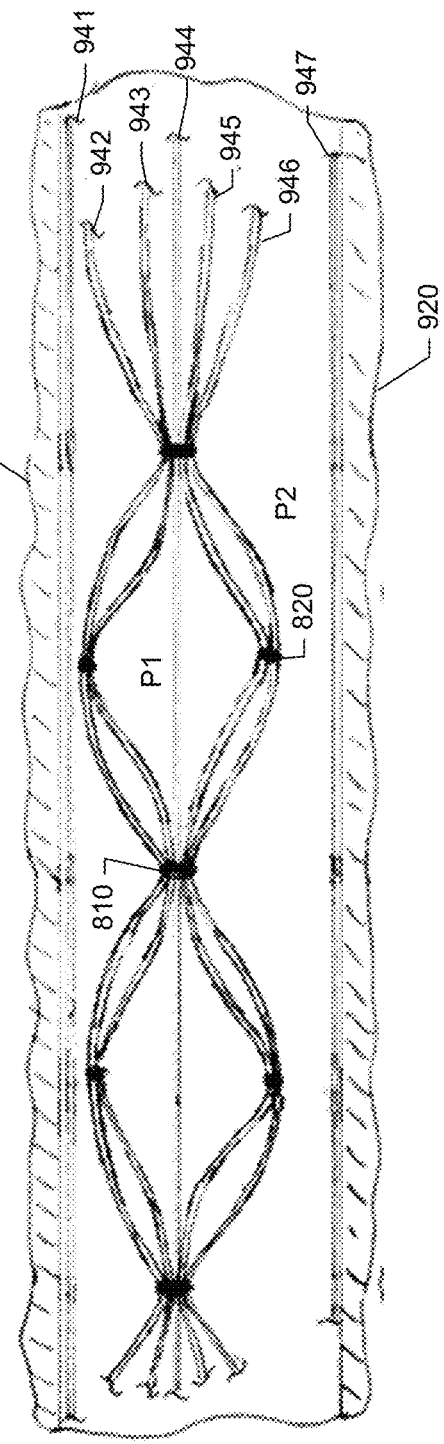

As shown in FIG. 9B, the pressure P1 inside the core is greater than pressure outside of the core. The face sheets 941 and 947 are pushed against the dies 910 and 920, thereby forming an outer contour of the structure. The cell sheets 943 and 945 begin to expand superplastically, except at the first weld nuggets 810. The micro-structure of the material subjected to the weld is changed to the extent that it has been rendered non-superplastic. The gaps between the first weld nuggets 810 provide vent holes to balance the gas pressure between the cells of the core structure during the forming process.

As shown in FIG. 9C, the pressure P1 within the core is increased to P1>>P2. The core sheets 942 and 946 are pushed against and diffusion bonded to the face sheets 941 and 947. The core sheets 942 and 946 also fold back onto themselves and diffusion bond to form rectangular walls. The cell sheets 943 and 945 continue expanding outward. The position of the septum sheet 944 is controlled by the relative superplasticity of the alloys and the thickness of the core sheets 942 and 946. For instance, the difference in thickness between the core sheets 942 and 946 causes the thinner core sheet 942 to form faster than the thicker core sheet 946. Consequently, the septum sheet 944 is skewed from the mid-plane position.

As shown in FIG. 9D, the SPF/DB structure is fully formed and diffusion bonded on all inner surfaces. The core sheets 942 and 946 form rectangular-shaped cells, and the cell sheets 943 and 945 form pyramid-shaped cells. The weld nuggets 810 and 820 retain their pre-form shape after SPF/DB forming.

After the pack has cooled, it is removed from the forming device. Neighboring cells on the same side of the septum sheet 944 and cells on opposite sides of the septum sheet 944 are fluid-connected either by openings created by expansion of the material between the weld nuggets or by the perforations in the sheets 943-945. These fluid connections enable gas inflation during the SPF/DB forming. Additionally, these openings and perforations perform a similar function to the openings on the cold side face sheet: they enable the cells to function as noise attenuation resonators. Thus, these openings and perforations provide additional degrees of freedom that improve the noise attenuation.

Figure 10:
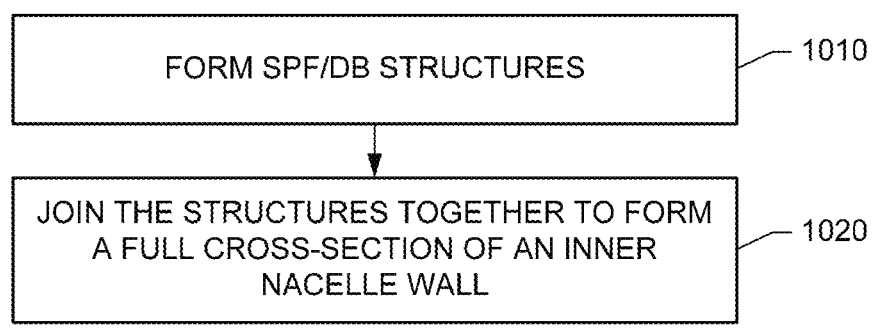
FIG. 10 is an illustration of a method of forming a nacelle inner wall from a plurality of SPF/DB structures.

Reference is made to FIG. 10, which illustrates a method of forming a nacelle inner wall from a plurality of SPF/DB structures. At block 1010, a plurality of SPF/DB structures are formed. At block 1020, the SPF/DB structures are joined (e.g., welded, fastened) together to form a full cross-section of the inner wall. The lengths of the joined structures may cover the engine core or they may extend beyond the engine core.

An SPF/DB structure herein is not limited to engine nacelles. Other aerospace applications include, but are not limited to, nozzle plugs of jet engines and tailpipes of Auxiliary Power Units.

An SPF/DB structure herein is not limited to aerospace applications. For instance, SPF/DB structures may be used as heat shields and noise attenuators for automobiles, trains, trucks, motorcycles for high performance exhaust, race cars, boats, ships, electrical generation turbines, rocket engine nozzles. The openings in the face sheets are generally oriented toward the primary source of sound to be attenuated.

The invention claimed is:

1. A propulsion system comprising:
   a turbine jet engine; and
   an engine nacelle including a cowling for the turbine jet engine, the cowling formed exclusively from an SPF/DB inner wall having a hot side face sheet directly adjacent to and positioned against an engine core of the turbine jet engine and a cold side face sheet spaced radially exterior to the hot side face sheet, the cold side face sheet including a plurality of noise attenuation openings.

2. The system of claim 1, wherein the turbine jet engine is a turbofan engine.

3. The system of claim 2, wherein the hot side face sheet also forms an outer duct for a core flow, and the cold side face sheet forms an inner duct for a bypass flow.

4. The system of claim 1, wherein the hot side face sheet is made of a material having better heat resistance than the cold side face sheet.

5. The system of claim 1, wherein the inner wall includes a plurality of monolithic SPF/DB structures joined together.

6. The system of claim 1, wherein the inner wall further has a sandwich core between the face sheets, the noise attenuation openings arranged to allow air to flow into the sandwich core.

7. The system of claim 6, wherein the sandwich core includes a plurality of cells; and wherein the cells and the noise attenuation openings in the cold side face sheet form a noise attenuating resonator.

8. The system of claim 6, wherein the hot side face sheet and the cold side face sheet have reduced superplastic properties relative to materials used to form the sandwich core in order to reduce mark-off in the face sheets.

9. The system of claim 6, wherein the sandwich core includes a perforated septum between the face sheets, a first plurality of cells between the septum and the hot side face sheet, and a second plurality of cells between the septum and the cold side face sheet.

10. The system of claim 9, wherein the septum is skewed with respect to the face sheets to provide an additional degree of freedom for noise attenuation at multiple frequencies.

11. The system of claim 9, wherein the cells are pyramid-shaped.

12. The system of claim 11, wherein walls of the cells are perforated to provide two additional degrees of freedom for noise attenuation.

13. A cowling for an engine comprising:
    an SPF/DB sandwich structure that forms an inner wall and used exclusively to form the cowling, the inner wall including a hot side face sheet, a cold side face sheet spaced radially exterior to the hot side face sheet and a sandwich core disposed there between, the hot side face sheet being directly adjacent to and positioned against an engine core of the engine and the cold side face sheet including a plurality of noise attenuation openings.

14. A monolithic SPF/DB sandwich structure used to form a cowling for an engine core of a turbine jet engine, the monolithic SPF/DB sandwich structure comprising:
    a core sandwiched between first and second face sheets, the core including a plurality of cells, the first face sheet being a cold side face sheet having a plurality of openings for allowing noise and air to enter into the cells and the second face sheet being a hot side face sheet, wherein the cowling is formed exclusively from the monolithic SPF/DB sandwich structure and the hot side face sheet is positioned directly adjacent to and against the engine core.

15. The structure of claim 14, wherein the core includes a perforated septum.

16. The structure of claim 15, wherein the septum is skewed towards one of the face sheets.

17. The structure of claim 14, wherein the cells are pyramid-shaped.

18. The structure of claim 14, wherein the sandwich structure is configured as an engine nacelle inner wall.

19. The structure of claim 14, wherein the sandwich structure is configured as a plug nozzle.

20. The cowling of claim 13, wherein the hot side face sheet also forms an outer duct for a core flow of the turbine jet engine, and the cold side face sheet forms an inner duct for a bypass flow of the turbine jet engine.

* * * * *